(No Model.)

J. E. DAVIS.
VALVE FOR PNEUMATIC TIRES.

No. 543,297.  Patented July 23, 1895.

Witnesses:
A. D. Harrison
Rollin Abell

Inventor:
J. E. Davis
by Wright Brown & Quinby
Attys

UNITED STATES PATENT OFFICE.

JOSEPH EDWIN DAVIS, OF LYNN, ASSIGNOR TO THE BOSTON WOVEN HOSE AND RUBBER COMPANY, OF BOSTON, MASSACHUSETTS.

VALVE FOR PNEUMATIC TIRES.

SPECIFICATION forming part of Letters Patent No. 543,297, dated July 23, 1895.

Application filed November 23, 1894. Serial No. 529,717. (No model.)

*To all whom it may concern:*

Be it known that I, JOSEPH EDWIN DAVIS, of Lynn, in the county of Essex and State of Massachusetts, have invented certain new and useful Improvements in Valves for Pneumatic Tires, of which the following is a specification.

This invention relates to metallic valves which are applied to pneumatic tires and are adapted for connection with an air-pump to inflate the tire. By the term "valve," as used throughout this specification, I mean the metallic casing or nipple through which an air-passage extends, said nipple having an internal check-valve adapted to yield and permit the inward movement of air into the tire and to be automatically closed by the air-pressure within the tire to prevent the escape of air therefrom.

My invention has for its object to provide an improved construction of the valve-case, whereby it may be detachably secured to the air-cushioned rubber tube or tire, and when in use will be securely interlocked with the wheel rim or felly, so that it cannot be disengaged from the tire.

To this end the invention consists in the improvements which I will now proceed to describe and claim.

Figure 1:
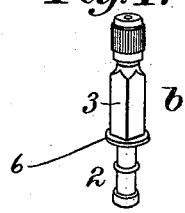
Figure 2:
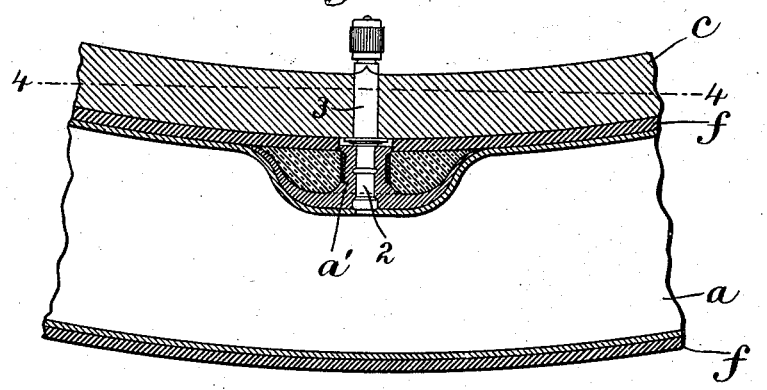
Figure 3:
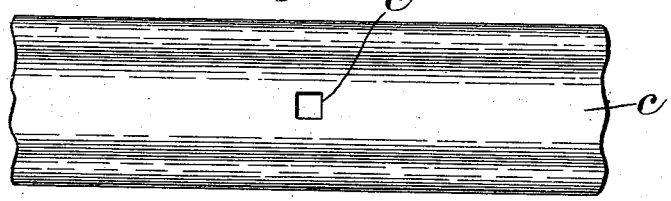
Figure 4:
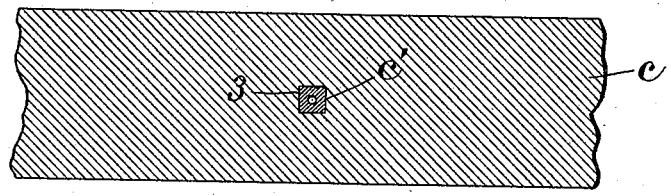
Figure 5:
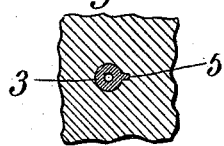

Of the accompanying drawings, forming a part of this specification, Figure 1 represents a perspective view of my improved valve. Fig. 2 represents a longitudinal section of a portion of a wheel rim and tire, showing my improved valve. Fig. 3 represents a plan view of the portion of the rim shown in Fig. 2. Fig. 4 represents a section on line 4 4 of Fig. 2. Fig. 5 represents a section similar to Fig. 4, showing a modification.

In the drawings, *a* represents a pneumatic tire having an elongated nipple *a'* containing an orifice adapted to receive the inner portion of the valve-case.

*b* represents the valve-case, which comprises an elongated inner section 2, adapted to enter and be detachably secured to said nipple, and an outer section 3, which is made square or of other equivalent form in cross-section, so that when inserted in a correspondingly-shaped orifice in the wheel-rim *c* the valve will be locked against rotation, and will thus be prevented from exerting torsional strain upon the nipple *a'*.

In Figs. 1 and 2 the nipple-engaging inner portion 2 of the valve is cylindrical and provided with suitable peripheral beads to give it a suitable hold upon the interior of the nipple, while the outer portion or locking-section 3 is made square in cross-section. The orifice *c'* in the rim *c* is also made square and of such size that it closely fits the locking-section 3, so that when the latter is in place it cannot be rotated.

In Fig. 5 I show a section of a valve cylindrical in form and provided with a longitudinal rib 5, which engages a corresponding groove in the wall of the orifice formed in the rim.

It will be seen that the locking-section by preventing the rotation of the valve protects the nipple and the joint between the same and the valve.

The valve is provided between the nipple-engaging portion 2 and the locking-section 3 with an enlargement or washer 6, which is rigidly secured to the valve and is of greater diameter than the width of the orifice *c'* in the rim, said washer bearing against the inner side of the rim, as shown in Fig. 2, and preventing outward movement of the valve through the rim, so that there will be no possibility of the valve being pulled out from the tire by want of care on the part of the operator when the tire is being inflated.

It will be seen that the elongated inner section 2 of the valve-case and the elongated nipple on the tire enable the valve-case to be detachably secured to the tire, so that the valve-case may be used interchangeably with different tires.

I claim—

1. A pneumatic-tire valve-case comprising a locking section 3 formed to engage and pass through a hole in the wheel-rim, an outwardly projecting central collar or washer 6 arranged to bear on the outer side of the wheel-rim, and a section or extension 2, adapted to be held outside the wheel-rim by said collar and presenting an elongated surface projecting into the space occupied by the tire for engagement with a nipple on the tire.

2. The combination with a pneumatic tire having an elongated outwardly projecting flexible nipple, of a valve-case comprising a locking section 3 formed to enter and pass through a hole in the wheel-rim, an outwardly projecting central collar or washer 6 arranged to bear on the outer side of the wheel-rim, and an elongated section or extension 2 inserted in and detachably secured to the said nipple, the said section 2 and the nipple thereon being held within the space occupied by the tire by the bearing of the collar on the wheel rim, so that the section 2 cannot be withdrawn from the nipple, said section and nipple forming an elongated air-tight connection between the valve-case and tire which is maintained by the engagement of the locking section of the valve-case with the wheel-rim and by the bearing of the collar 6 on said rim, as set forth.

3. The combination with a wheel-rim having a square or equivalently shaped hole, and with a pneumatic tire surrounding said rim and having a nipple projecting toward the rim, of a valve-case comprising a locking section 3 formed to fit said hole in the wheel-rim, an outwardly projecting central collar or washer 6 arranged to bear on the outer side of the wheel-rim, and an elongated section or extension 2 inserted in and detachably secured to the said nipple, the said section 2 and the nipple thereon being held within the space occupied by the tire by the bearing of the collar on the wheel-rim, so that the section 2 cannot be withdrawn from the nipple, said section and nipple forming an elongated air-tight connection between the valve-case and tire which is maintained by the engagement of the locking section of the valve-case with the wheel-rim and by the bearing of the collar 6 on said rim, as set forth.

In testimony whereof I have signed my name to this specification, in the presence of two subscribing witnesses, this 20th day of November, A. D. 1894.

JOSEPH EDWIN DAVIS.

Witnesses:
H. T. HERING,
W. F. ROBINSON.